April 23, 1957     W. E. BURNS     2,789,468
BOMB RACK HOOK RELEASE LINKAGE
Filed Nov. 26, 1954
Fig. 1
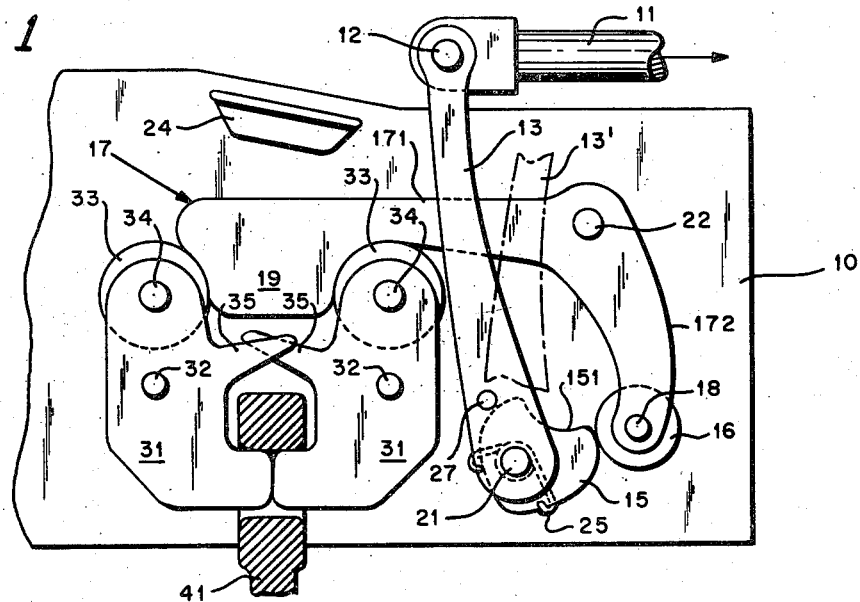
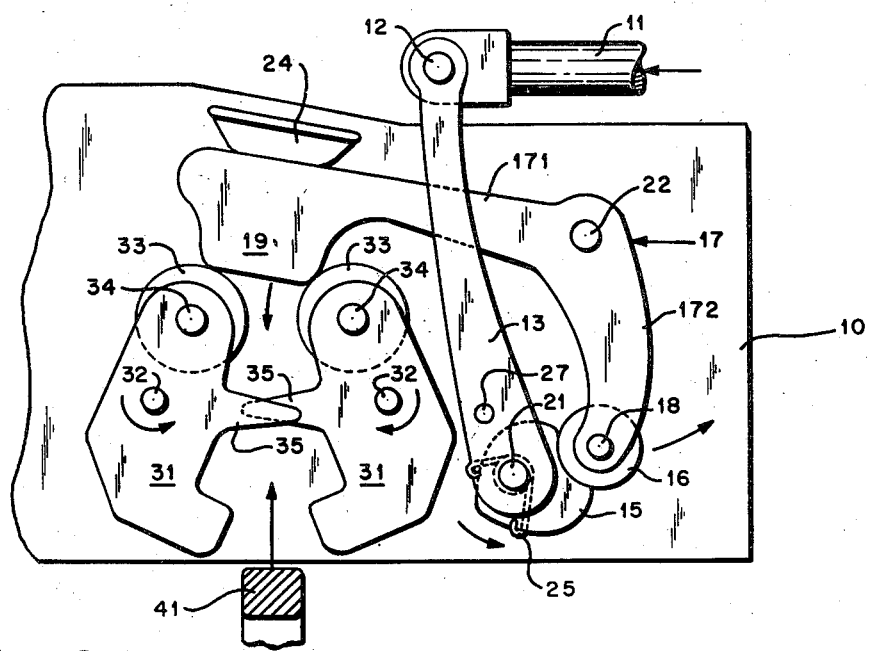
Fig. 2
INVENTOR.
WILLIAM E. BURNS
BY
*J. Schmitt*
*H. F. Ross*
ATTORNEYS

2,789,468

BOMB RACK HOOK RELEASE LINKAGE

William E. Burns, Philadelphia, Pa.

Application November 26, 1954, Serial No. 471,543

7 Claims. (Cl. 89—1.5)

(Granted under Title 35, U. S. Code (1952), sec. 266)

The invention described herein may be manufactured and used by or for the Government of the United States of America for governmental purposes without the payment of any royalties thereon or therefor.

This invention relates to a bomb rack hook release linkage and more particularly to a bomb rack hook release linkage capable of releasing extremely high loads by the application of very light trigger forces and arranged so that it may be cocked independent of the position of the bomb rack hooks.

There are many known types of hook release linkages including numerous types especially designed for incorporation in bomb rack assemblies to control the bomb supporting hooks therein. However, many such devices incorporate relatively complex mechanisms which render them excessively large and heavy for use on aircraft where both weight and space are critical. In addition, many such devices are limited as to load carrying capacity by the fact that substantial increases in the loads supported generate excessive forces within the release linkage and require very large trigger forces for release of the hooks. This difficulty cannot be satisfactorily overcome in aircraft installations by strengthening the component parts of the linkage and by incorporating more powerful triggering and cocking mechanisms because these remedies add substantially to the weight and bulk of the complete assembly. Moreover, many such devices are so constructed that the release linkage cannot be cocked except when the bomb supporting hooks are placed in their locked positions with the load suspension means in engagement therewith. This restriction upon the operation of such devices frequently makes the loading operation much more difficult, especially in the case of loading very large bombs on aircraft.

The present invention contemplates a bomb supporting hook release linkage of relatively simple and compact construction especially suited for installations where space limitations are critical. The component parts of the device comprising the present invention are arranged so that bomb hooks locked in positions in which they support an extremely large load may be released from their locked positions by application of a very small triggering force to the release linkage, yet this device may be cocked independent of the position of the load supporting hooks which subsequently become positively locked when they are moved into their locked positions by engagement with the suspension means attached to the load which they are to support.

An object of the present invention is to provide a simplified release linkage for high capacity load supporting hooks.

Another object is the provision of a release linkage for high capacity load supporting hooks which can be operated by the application of very small actuating forces.

A further object is to provide a release linkage for load supporting hooks arranged so that the supporting hooks are displaced from their locked position by the force exerted by the load supported thereon, without transmitting this substantial force through the various elements of the release linkage itself.

A final purpose of this invention is the provision of a release linkage for load supporting hooks which includes a relatively movable locking cam and cam supporting arm arranged so that the release linkage can be cocked independent of the position of the load supporting hooks controlled thereby.

The exact nature of this invention as well as other objects and advantages thereof will be readily apparent upon consideration of the following description relating to the annexed drawings in which:

Fig. 1 illustrates a simplified semi-schematic representation of a preferred embodiment of the present invention with the load supporting hooks positively restrained in their locked positions, and Fig. 2 shows a simplified semi-schematic representation of the embodiment of the present invention shown also in Fig. 1 with the release mechanism cocked while the load supporting hooks remain in their unlocked position.

Referring now to the drawings, wherein like reference numerals designate like or corresponding parts throughout the several views, Fig. 1 illustrates an embodiment of the present invention in which a release linkage including an actuating plunger 11, a cam control arm 13, a locking cam 15, a bellcrank sear lever 17 including arms 171 and 172, and a sear block 19 which comprises the control mechanism for a pair of load supporting hooks 31 each rotatably mounted upon a pivotal support 32 and provided with a roller 33 rotatably attached thereto by means of a pivot 34. The load supporting hooks are so arranged that when they are latched in their locked positions by the sear block 19 of the release linkage, as shown in Fig. 1, they provide support for a load releasably attached thereto by means of a suitable load suspension means such as the eyebolt 41, which may be fixedly secured to a load such as a bomb by any suitable means such as threadable engagement therewith. The member designated by the reference numeral 10 is a schematic representation of the housing or supporting frame within or upon which the components of the present invention are secured. Therefore, it is to be understood that the pivotal supports 21, 22, and 32, as well as the shock absorbing member 24, are fixedly secured to and supported by the frame 10.

Fig. 2 shows the respective parts of the embodiment shown in Fig. 1 in the positions which they assume after the load supporting hooks have been released from their locked positions by operation of the release linkage and the release linkage has been cocked by returning the cam control arm 13 to its cocked position. In Fig. 2 the load supporting hooks 31 are shown in their unlocked open positions to which they have been moved as the load attached thereto fell clear of the hooks.

The various phases of operation of the instant invention will be described in relation to the showings in the respective figures. Beginning with the load supporting hooks 31 secured in their locked positions and in engagement with the eyebolt 41 by means of which they are supporting a load not shown (see Fig. 1), the downwardly directed force applied to the hooks by the weight of the load supported thereby creates a tendency for the respective hooks to rotate about their respective supporting pivots 32 to bring the rollers 33 closer together. This condition causes the rollers 33 to continuously apply opposing forces to the sear block 19 so directed, due to the shape of the block 19, that small components of these forces applied to the block 19 tend to force the sear block upwardly out of its latching position between the rollers 33. However, the sear block 19, either formed integrally with or fixedly secured to the arm 171 of the sear lever 17, is maintained in its latching position by the engagement of the locking or trigger cam 15 with the roller 16 rotatably mounted by means of pivot 18 upon the end of the arm 172 of the rigid sear lever 17. The locking cam 15 in turn is maintained in its locking position by its engagement with the stop 27 mounted upon the cam control arm 13 rotatable with the cam 15 about the pivotal support 21 and positioned by the actuating plunger 11. The actuating plunger 11 may be operated manually but it is preferably operated by a suitable automatic actuating or triggering device not illustrated since such devices are well known and it is not considered part of the present invention. In order to release the load attached to the hooks 31, the actuating plunger 11 is moved to the right as shown in Fig. 1 until the cam control arm 13 connected to the plunger by the pivot 12 is moved clockwise to the position shown in dot-dashed lines and identified by the reference numeral 13'. Since the stop 27 on the arm 13 is in engagement with the cam 15, clockwise movement of the arm 13 will produce simultaneous clockwise movement of the cam 15 so that the roller 16 will be seated in the arcuately curved concave face 151 of the cam. This shift in the relative positions of the cam 15 and the roller 16 makes possible limited clockwise movement about the pivotal support 22 of the sear lever 17 upon which the roller 16 is mounted. Such movement of the sear lever 17 in response to clockwise rotation of the cam 15 is assured by the forces described above continually applied to the sear block 19 by the rollers 33. As a result of this movement of the sear lever 17, the sear block is raised to the position in which it is shown in Fig. 2 so that the hooks 31 may rotate to their unlocked open positions to release the load supported thereby.

The loading procedure includes a release linkage cocking operation and a hook latching operation. The release linkage is first cocked by moving the actuating plunger 11 to the left as shown in Figs. 1 and 2 to return the cam control arm 13 to the position indicated in solid lines in both figures. During this movement of the arm 13 the cam 15 is retained in the position indicated in Fig. 2 by engagement of the roller 16 with the arcuate surface 151 of the cam 15 which overcomes the biasing effect of the spring 25. To insure this result, the hooks 31 may be provided with biasing springs, not shown, to maintain them in their unlocked positions until they are once more forced into their locked positions. In this manner the sear lever may be maintained in the position shown in Fig. 2 throughout the cocking operation by engagement of the rollers 33 with the sear block 19. With the device cocked as illustrated in Fig. 2, the load supporting hooks 31 are automatically returned to their locked positions by rotation about the pivotal supports 32 in the directions indicated by the arrows as the eyebolt 41 or other suspension means for another load is lifted upwardly into engagement with the pair of ears 35 projecting from the respective supporting hooks 31. When the hooks have been returned to their locked positions in which they are shown in Fig. 1, the biasing spring 25 becomes effective to bias the cam 15 counterclockwise into engagement with the stop 27 as the sear lever rotates counterclockwise to seat the sear block between the rollers 33. Thus, the hooks are once more secured in their locked position by rotation of the cam 15 from the position shown in Fig. 2 to the position shown in Fig. 1.

It will be noted that the point of contact between the cam 15 and the roller 16 is slightly over-center relative to the line between the axes of the pivotal support 21 and the pivot 18. Consequently, the sear lever 17 is retained in the position in which it is shown in Fig. 1 as long as the cam 15 and the cam supporting arm 13 remain in the positions in which they are shown in solid lines in Fig. 1, with the result that the forces applied to the sides of the sear block 19 by the rollers 33 tending to drive the sear block from between the rollers only presses the roller 16 more firmly against the cam 15 to seat it securely against the stop 27. In addition, it is important that the sear block 19 be shaped and arranged in relation to the rollers 33 so that the resultant forces applied by the rollers 33 to the sear block 19 due to the load supported by the hooks 31, each have a small component tending to drive the sear block upwardly and out from between the rollers 33 when the rollers are positioned as shown in Fig. 1 relative to the sear block. This component of force is essential to insure that the load supporting hooks 31 will be moved out of their locked positions immediately to release the load when the release linkage is actuated. As the rollers 33 move along the surface of the sear block 19, and around its lower corners, the components of the forces applied tending to drive the sear block upwardly increase rapidly until the load is completely freed from the hooks 31. In order to avoid transmitting excessive forces from this source throughout the release linkage, a shock absorber 24 may be provided to resiliently cushion the sear lever 17 as it moves out from between the rollers 33.

Various alternate methods of construction may be used in fabricating a load supporting hook release linkage according to the teachings of the present invention. For example, the sear block 19 might be mounted on the end of a plunger for pure translational movement where space permits instead of upon a sear lever as shown in the illustrative embodiment. However, such a configuration would inevitably require more space than that of the one shown. The present invention may be employed with various different types of load supporting hooks other than the particular hooks shown in the illustrative embodiment. Moreover, the teachings of this invention could be applied to installations where only a single hook is used by strengthening the sear lever 17 and its pivotal support 22 to withstand the unopposed and hence unbalanced loads imposed thereon by a single hook.

Thus, the present invention provides a release linkage for load supporting hooks by means of which the hooks are positively locked to preclude inadvertent release under impact, yet operable upon application of very moderate trigger forces to release the hooks from their locked positions from which they are positively displaced by an opening force which is continuously acting upon the sear block as long the hooks remain in their locked positions. In addition, the device comprising the instant invention includes an uncomplicated linkage fully effective for its intended purpose and under a wide range of operating conditions in installations where both weight and space limitations are critical.

Obviously, many modifications and variations of the present invention are possible in the light of the above teachings. It is, therefore, to be understood that within the scope of the appended claims the invention may be practiced otherwise than as specifically described.

What is claimed is:

1. A bomb rack hook control mechanism comprising an elongated bomb supporting hook, pivotally mounted intermediate its ends for angular movement between a locked bomb supporting position and an open bomb release position, a first fixedly secured supporting pivot upon which said hook member is mounted, a roller member pivotally mounted upon the upper end of said hook member, a bellcrank member including first and second angularly offset lever arms pivotally mounted intermediate its ends for angular movement about an axis parallel to that of said first supporting pivot, a second fixedly secured supporting pivot for said bellcrank, a tapered sear block fixedly secured to the free end of said first lever arm, a roller pivotally mounted upon the free end of said second lever arm, an elongated cam control arm pivotally mounted at one end for rotation about an axis parallel to said first and second supporting pivots and disposed in the immediate vicinity of the free end of said second lever arm, a third fixedly secured supporting pivot for said cam control arm, a stop means projecting from said cam arm adjacent its pivotally mounted end, a generally kidney-shaped locking cam rotatably mounted with said cam arm upon said third supporting pivot for limited angular movement about the same axis of rotation, spring biasing means interconnecting said cam and said cam arm effective to bias said locking cam into engagement with said stop means, and an actuating means connected to the other end of said cam arm and arranged to induce angular movement of said cam arm between a cocked position and a released position.

2. A bomb rack hook control mechanism including a pair of opposed elongated hook members, each pivotally mounted intermediate its ends for angular movement between a locked position and a released position, a pair of horizontally disposed spaced parallel supporting pivots upon which said hook members are mounted, a pair of roller members, each pivotally mounted upon the upper end of one of said hook members, a bellcrank member including first and second lever arms pivotally mounted intermediate its ends for angular movement about an axis parallel to said supporting pivots, a tapered sear block fixedly secured to the free end of said first lever arm, a roller pivotally mounted upon the free end of said second lever arm, an elongated cam control arm pivotally mounted at one end for rotation about an axis parallel to said supporting pivots and disposed in the immediate vicinity of the free end of said second lever arm, a stop means projecting from said cam control arm adjacent its pivotally mounted end, a generally kidney-shaped triggering cam pivotally mounted adjacent said cam control arm for angular movement about the same axis of rotation, spring biasing means effective to bias said triggering cam into engagement with said stop means, and an actuator connected to the other end of said cam control arm and arranged to induce angular movement of said cam control arm between a cocked position and a released position.

3. A device as described in claim 2, and, in addition, a shock absorbing means disposed adjacent to the first lever arm and arranged to absorb the forces generated when the sear block is dislodged from between the roller members, whereby the triggering cam is protected from the application of excessive forces thereto.

4. A device for releasably supporting a load comprising at least one elongated load supporting hook rotatably mounted intermediate its ends for rotation about a horizontal axis between a first locked position and a second open position, and a release linkage normally effective to positively retain said hook in its first locked position and operable to release said hook from its locked position for movement to its open position, said release linkage including a tapered sear block movable into and out of engagement with the upper end of said hook, a rotatably mounted elongated cam supporting arm and a rotatably mounted locking cam mounted with said arm on a common pivotal support for restricted rotary movement relative to said arm into and out of a locked position, biasing means continuously urging said locking cam toward its locked position, and an elongated lever member rotatably mounted intermediate its ends for movement about an axis parallel to the axis of rotation of said hook, one end of said lever member being connected to said tapered sear block and the other end of said lever member being disposed adjacent said locking cam, whereby said cam supporting arm may be rotated independently of said locking cam to place said device in a cocked condition while said hook remains in its open position to receive a load to be attached thereto, and thereafter, said locking cam may be biased into its locked position to secure the hook in its locked position.

5. A device for releasably supporting a load comprising a pair of opposed elongated load supporting hooks rotatably mounted intermediate their ends for rotation about horizontally spaced horizontal axes between first locked positions and second open positions, and a release linkage normally effective to positively retain said hooks in their first locked positions and operable to release said hooks from their locked positions for movement to their open positions, said release linkage including a tapered sear block movable into and out of engagement with the upper ends of said hooks, a rotatably mounted elongated cam supporting arm, a rotatably mounted locking cam mounted with said arm on a common pivotal support for restricted rotary movement relative to said arm into and out of a locked position, biasing means continuously urging said locking cam toward its locked position, and an elongated lever member rotatably mounted intermediate its ends for movement about an axis parallel to the axes of rotation of said hooks, one end of said lever member being connected to said tapered sear block and the other end of said lever member being disposed adjacent said locking cam whereby said cam supporting arm may be rotated independently of said locking cam to place said device in a cocked condition while said hooks remain in their open positions to receive a load to be attached thereto, and thereafter, said locking cam may be biased into its locked position to secure the hooks in their locked positions.

6. A bomb rack hook control mechanism comprising an opposed pair of elongated bomb supporting hooks, each pivotally mounted intermediate its ends for angular movement between a locked bomb supporting position and an open bomb release position, first and second fixedly secured supporting pivots upon which said hook members are mounted, a roller member pivotally mounted upon the upper end of each of said hook members, a bell crank member including first and second angularly offset lever arms pivotally mounted intermediate its ends for angular movement about an axis parallel to that of said first and second supporting pivots, a third fixedly secured supporting pivot for said bell crank, a tapered sear block fixedly secured to the free end of said first lever arm, a roller pivotally mounted upon the free end of said second lever arm, an elongated cam control arm pivotally mounted at one end for rotation about an axis parallel to said third supporting pivot and disposed in the immediate vicinity of the free end of said second lever arm, a fourth fixedly secured supporting pivot for said cam conrtol arm, stop means projecting from said cam arm adjacent its pivotally mounted ends, a generally kidney-shaped locking cam rotatably mounted with said cam arm upon said fourth supporting pivot for limited angular movement about the same axis of rotation, spring biasing means interconnecting said cam and said cam arm effective to bias said locking cam into engagement with said stop means, and an actuating means connected to the other end of said cam arm and arranged to induce angular movement of said cam arm between a cocked position and a released position.

7. A bomb rack hook control mechanism including at least one elongated hook member, pivotally mounted intermediate its ends for angular movement between a locked position and a released position, a horizontally disposed supporting pivot upon which said hook member is mounted, a roller member pivotally mounted upon the upper end of said hook member, a bell crank member including first and second lever arms pivotally mounted intermediate its ends for angular movement about an axis parallel to said supporting pivot, a tapered sear block fixedly secured to the free end of said first lever arm, a roller pivotally mounted upon the free end of said second lever arm, an elongated cam control arm pivotally mounted at one end for rotation about an axis parallel to said supporting pivot and disposed in the immediate vicinity of the free end of said second lever arm, a stop means projecting from said cam control arm adjacent its pivotally mounted end, a generally kidney-shaped triggering cam pivotally mounted adjacent said cam control arm for angular movement about the same axis of rotation, spring biasing means effective to bias said triggering cam into engagement with said stop means, and an actuator connected to the other end of said cam control arm and arranged to induce angular movement of said cam control arm between a cocked position and a released position.

References Cited in the file of this patent

UNITED STATES PATENTS 2,610,887   Firman ---------------- Sept. 16, 1952

FOREIGN PATENTS

| 212,036 | Great Britain | Mar. 6, 1924 |
| 236,671 | Great Britain | July 14, 1925 |
| 572,809 | Great Britain | Oct. 24, 1945 |
| 477,722 | Canada | Oct. 9, 1951 |